United States Patent

[11] 3,624,669

| | | |
|---|---|---|
| [72] | Inventor | Eugene J. Lewis<br>Gainesville, Ga. |
| [21] | Appl. No. | 32,895 |
| [22] | Filed | Apr. 29, 1970 |
| [45] | Patented | Nov. 30, 1971 |
| [73] | Assignee | Gainesville Machine Company Inc.<br>Gainesville, Ga. |

[54] POULTRY GIZZARD PROCESSING MACHINE
7 Claims, 9 Drawing Figs.

[52] U.S. Cl. ............................................. 17/11
[51] Int. Cl. ............................................. A22c 21/06
[50] Field of Search ................................. 17/11, 43, 45

[56] References Cited
UNITED STATES PATENTS

| | | | |
|---|---|---|---|
| 2,630,599 | 3/1953 | Grant et al. | 17/43 |
| 2,791,798 | 5/1957 | Shickel et al. | 17/11 |
| 3,172,148 | 3/1965 | Hill | 17/11 |
| 3,406,425 | 10/1968 | Hill | 17/11 |

Primary Examiner—Lucie H. Laudenslager
Attorney—Newton, Hopkins & Ormsby

ABSTRACT: A machine for splitting, cleaning and removing the liner sac from the gizzards of fowl. After splitting, the gizzards are spread open and cleaned and they are then caused to be deposited upside-down onto an inclined flume where they are flushed onto a pair of helically ribbed rotating peeling rolls for removing the sac. A pivoted V-shaped tamping plate overhangs the peeling rolls and is driven with a vertical tamping motion to assure that the sac is engaged and removed by the rolls while the gizzards are fed along the rolls due to the action of the helical ribs. The plate also prevents the gizzards from turning over. Near the end of the peeling rolls a deflector plate turns the gizzards over again and pushes them to one side onto an inspection table formed by a series of spaced rods. A second pair of peeling rolls is exposed so that the inspector may remove any incompletely removed sac by manually applying a gizzard against the exposed rolls.

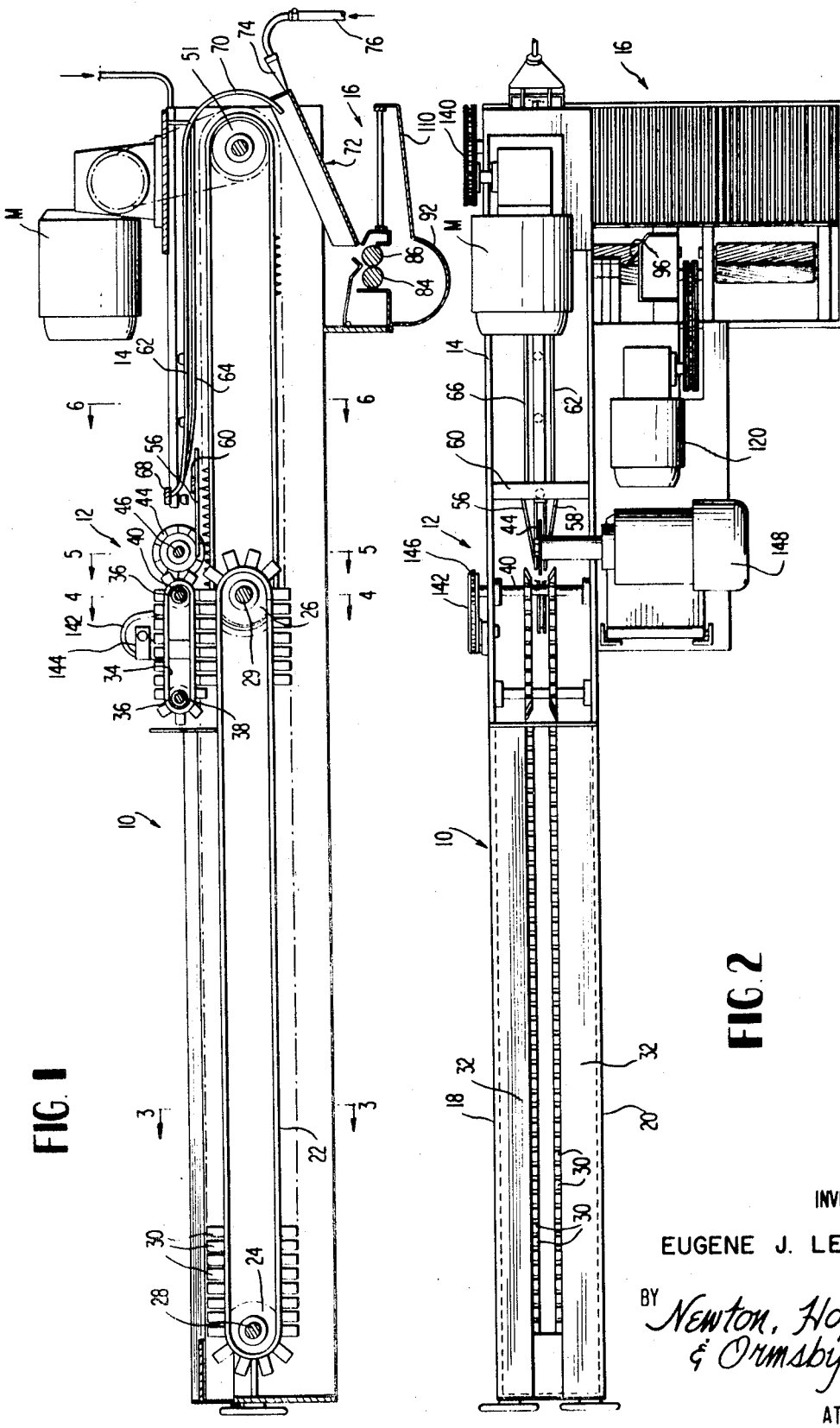

POULTRY GIZZARD PROCESSING MACHINE

BACKGROUND OF THE INVENTION

Poultry gizzard processing machines of the type in which the gizzard after removal from the fowl is subjected to splitting, cleaning and removal of the sac so as automatically to process the gizzards include an orienting section in which the gizzards are disposed with their large ends up and are caused thereafter to pass a rotary splitting knife while being engaged from underneath by a spiked conveyor chain. The spiked conveyor chain carries the split gizzard past an opening device and at the discharge end of the conveyor where the chain passes over a sprocket, the gizzards are turned upside-down and placed upon a pair of rotating peeling rolls which include interengaged helical ribs whose purpose is simultaneously to grasp the liner or sac and remove it from the gizzard and to travel the gizzard longitudinally along the rolls ultimately for discharge whereafter inspection and hand cleaning, when necessary, is performed prior to packaging of the gizzards. A machine of this general type is disclosed in the patent to C. J. Hill, U.S. Pat. No. 3,172,148, issued Mar. 9, 1965.

Although the orienting, splitting and cleaning portions of such machines have been perfected to such a degree as insures substantially trouble-free and efficient operation thereof, the sac removal sections of these machines has been propense to certain difficulties, notably the tendency for failure to remove the sac and for the gizzards to turn upside-down so that their split side is up when on the peeling rolls.

BRIEF SUMMARY OF THE INVENTION

It is of primary concern in connection with the present invention to provide an improved form of sac removing section for poultry gizzard processing machines.

In particular, the principal object of the present invention is to provide a combined sac removing section and inspection station wherein a first pair of peeling rolls is provided for automatically removing the sac whereafter the cleaned and sac-removed gizzards are discharged to one side and turned over onto an inspection table. An exposed pair of peeling rolls is provided so that the inspector may pick up a gizzard from which the sac is not completely removed and manually apply it to the exposed peeling rolls for final sac removal thereby.

It is a further object of this invention to provide an improved arrangement as described above wherein the drive for the peeling rolls includes an oscillating drive mechanism for a V-shaped tamping plate or fingers which cooperate with the automatic peeling rolls to assure more efficient sac removal thereby and including the function of preventing the gizzards from turning over on the peeling rolls.

A further objective of this invention is realized by the utilization of a deflector plate adjacent the ends of the automatic peeling rolls which causes the gizzards to be turned over and laterally displaced onto the inspection table so that the inspector may easily ascertain whether or not any particular gizzard has been properly cleaned.

BRIEF DESCRIPTION OF THE DRAWING FIGURES

FIG. 1 is a longitudinal section taken through a machine constructed according to the present invention;

FIG. 2 is a plan view of the assembly shown in FIG. 1;

DETAILED DESCRIPTION OF THE INVENTION

Figure 3:
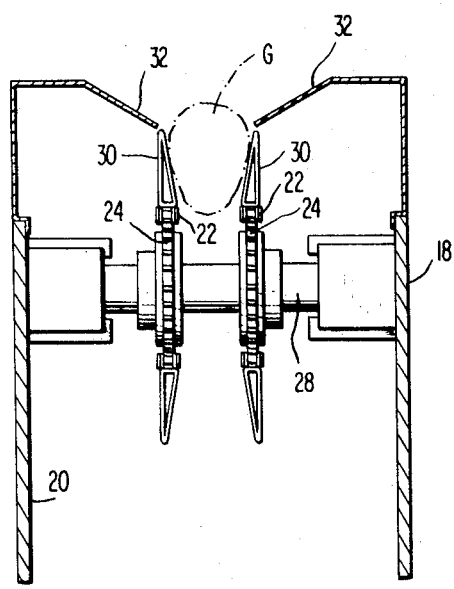
FIG. 3 is an enlarged transverse section taken substantially along the plane of section line 3—3 in FIG. 1.

With reference now more particularly to FIGS. 1 and 2, the machine according to the present invention includes the orienting section indicated generally by the reference character 10, the splitting section indicated generally by the reference character 12, the cleaning section indicated generally by the reference character 14 and the sac removal and inspection station indicated generally by the reference character 16.

The side frame members 18 and 20 are disposed in spaced relationship to each other as may be seen in Fig. 2 and in the space therebetween is provided a pair of spaced chains 22 trained at their opposite ends over respective sprockets 24 and 26 carried by the cross-shafts 28 and 29, one of which is driven. The links of the two chains 22 are provided with outstanding wings 30 which cooperate with the top plate members 32 fixed to the side frame members 18 and 20 and serve to guide the gizzards between the wings as is indicated by the reference character G in FIG. 3.

Figure 4:
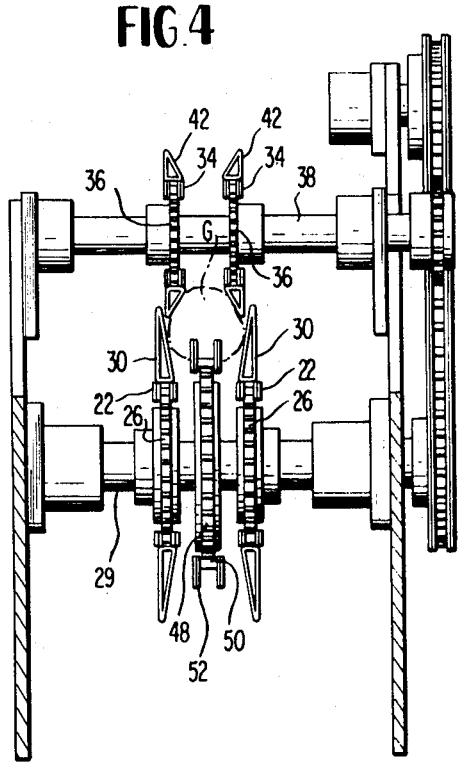
FIG. 4 is an enlarged transverse section taken along the plane of section line 4—4 in FIG. 1.
Figure 5:
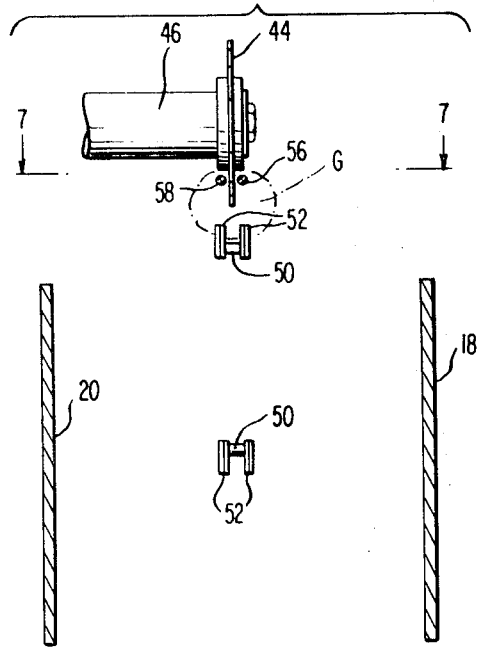
FIG. 5 is an enlarged transverse section taken along the section line 5—5 in FIG. 1.

Beyond the ends on the plates 32, as may be seen in FIG. 1, relatively short chains 34 are trained about sprockets 36 carried by the respective shafts 38 and 40 and, as may be seen in FIGS. 2 and 4, the chains 34 are disposed in slightly closer spacing as compared with the chains 22 so that the wings 42 carried by the links of the chains 34 may extend between the wings 30 so as positively to grip the gizzards G as illustrated. Just beyond the chains 34 is a rotary cutting blade 44 mounted on a suitable drive shaft 46 therefor, the knife being disposed centrally between the aforementioned chains as may be seen best in FIG. 2 so that the gizzards G as firmly held by the chains 34 and 22 as shown in FIG. 4 are fed to the knife 44 and split thereby on their uppermost larger sides.

Figure 6:
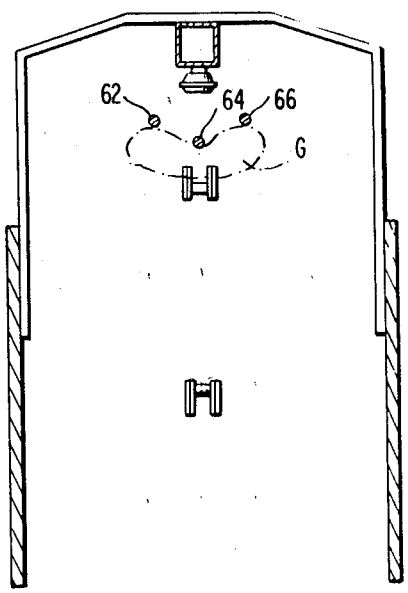
FIG. 6 is an enlarged transverse section taken substantially along the plane of line 6—6 in FIG. 1.
Figure 7:
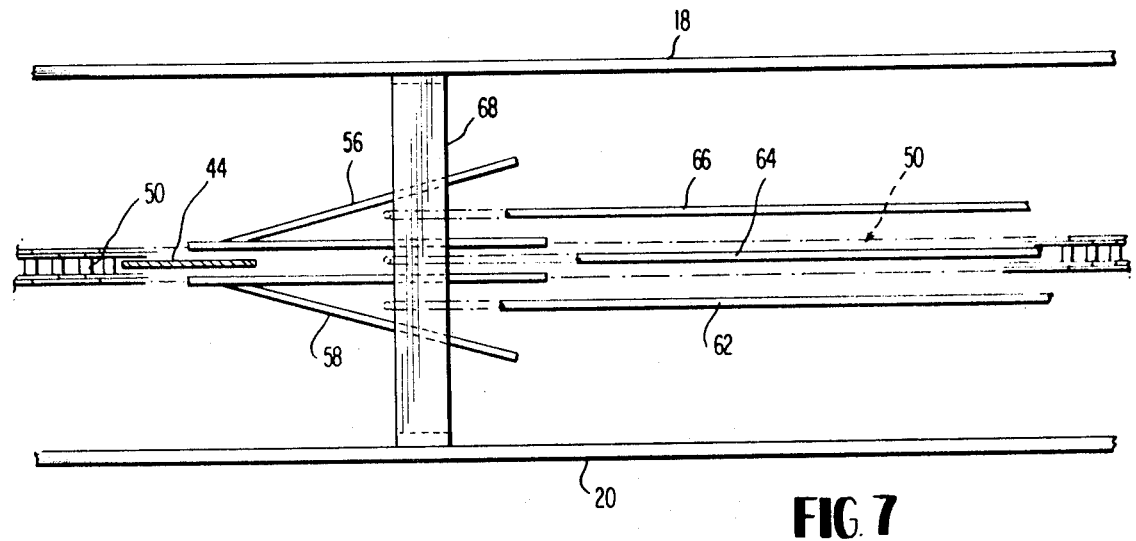
FIG. 7 is an enlarged plan view of the region of the machine depicted in FIGS. 5 and 6.

The cross-shaft 29 carries a further sprocket 48 between the two sprockets 26 fixed thereto as may be seen in FIG. 4, and one end of a conveyor chain 50 is trained over this sprocket, the opposite end of the chain being trained over the drive sprocket 51 as shown in FIG. 1. The links of the chain 50 carry spikes 52 upon which the gizzards are impaled in the region of the discharge end of the chains 22 and 34 so that while being split, the gizzards are carried by the chain 50 past the spreading bars 56 and 58 fixed to a suitable cross frame member 60 of the machine. After being spread apart, the cut gizzard is held in flattened condition by a series of rods 62, 64 and 66 as is shown in FIG. 6. These rods extend from the frame cross member 68 and whereas the central rod 64 is terminated above the sprocket 52, the ends 70 of the two rods 62 and 66 are curved and carried part way around the sprocket as shown in FIG. 1 to retain the gizzards in impaled relation on the spikes 52 until they are turned upside-down and fall off the spikes 52 by their own weight onto the inclined trough or flume 72.

Figure 8:
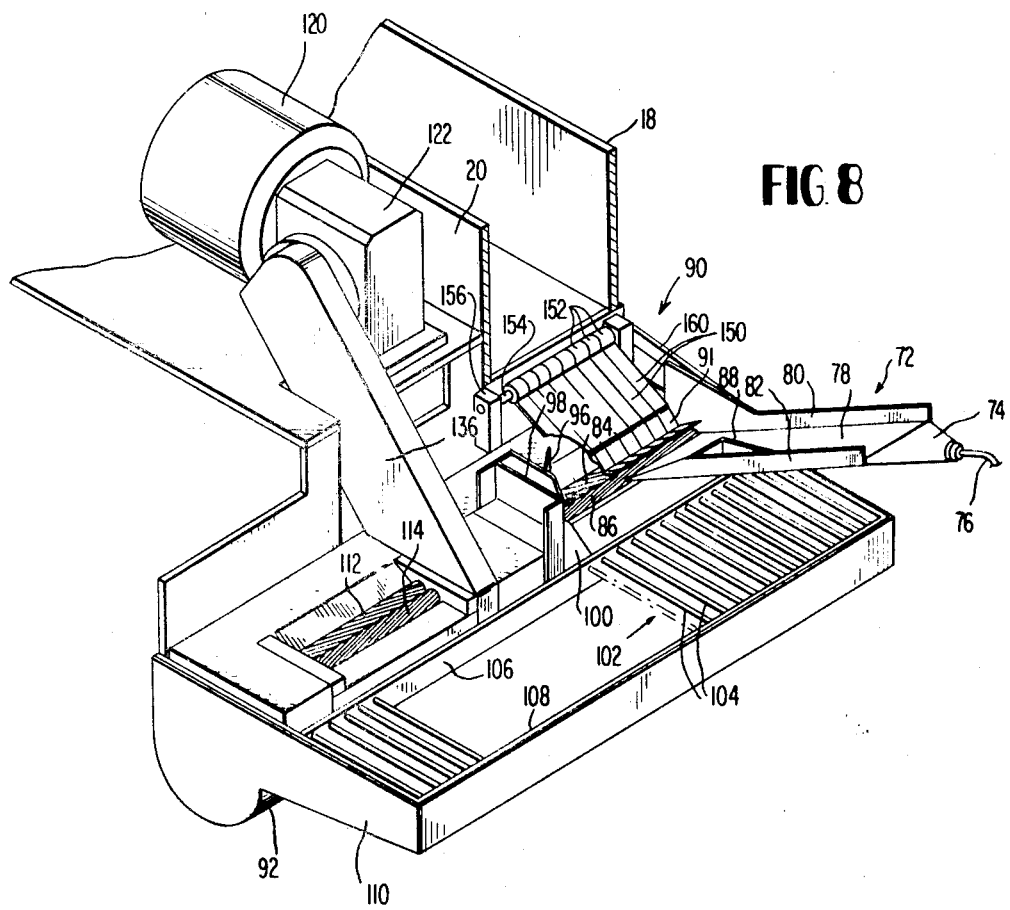
Fig. 8 is a perspective view of the automatic peeling and inspection station.

A broad mouth nozzle 74 connected to a suitable source of water 76 discharges a flood of water down the inclined bottom 78 between the upstanding sidewalls 80 and 82, see particularly FIG. 8, and flushes the gizzards down the flume onto a pair of peeling rolls 84 and 86. A deflector wall 88 deflects the gizzards to one side of the flume 72 so that they are discharged onto the rolls 84 and 86 at one end thereof. The rolls are provided with helical ribs which are interengaged and one of these rolls, as will be hereinafter described, is driven whereas the interengagement of the helical ribs causes them to rotate in unison. As the split gizzards are discharged face down onto the rolls 84 and 86, the helical ribs of the rotating rolls tend to feed the gizzards to the left in FIG. 8 and as they travel along, they pass beneath the tamping device indicated generally by the reference character 90 which has a V-shaped marginal edge portion 91 in register above the rolls 84 and 86 and directed toward the nip therebetween to periodically force the gizzards downwardly against the rolls and assure that the sac is gripped by and removed under the action of the rolls. The removed sacs are discharged into the catch basin 92 below the rolls as is shown in FIG. 1 and the thus-cleaned gizzards then pass beyond the left-hand side of the tamping plate 90 in FIG.

8 toward the corresponding ends of the rolls 84 and 86 whereat they encounter the transversely inclined deflector plate 96 on the end wall assembly 98 so that the gizzards are then turned back over with their split sides up and laterally discharged to pass over the inclined apron 100 onto the inspection table indicated generally by the reference character 102. The inspection table may consist simply of a series of spaced rods or bars 104 secured between the frame pieces 106 and 108 and below which the extension 110 of the catch basin is provided. The thus-discharged gizzards are disposed split side up so that the inspector may easily ascertain whether or not they have been properly cleaned.

Figure 9:
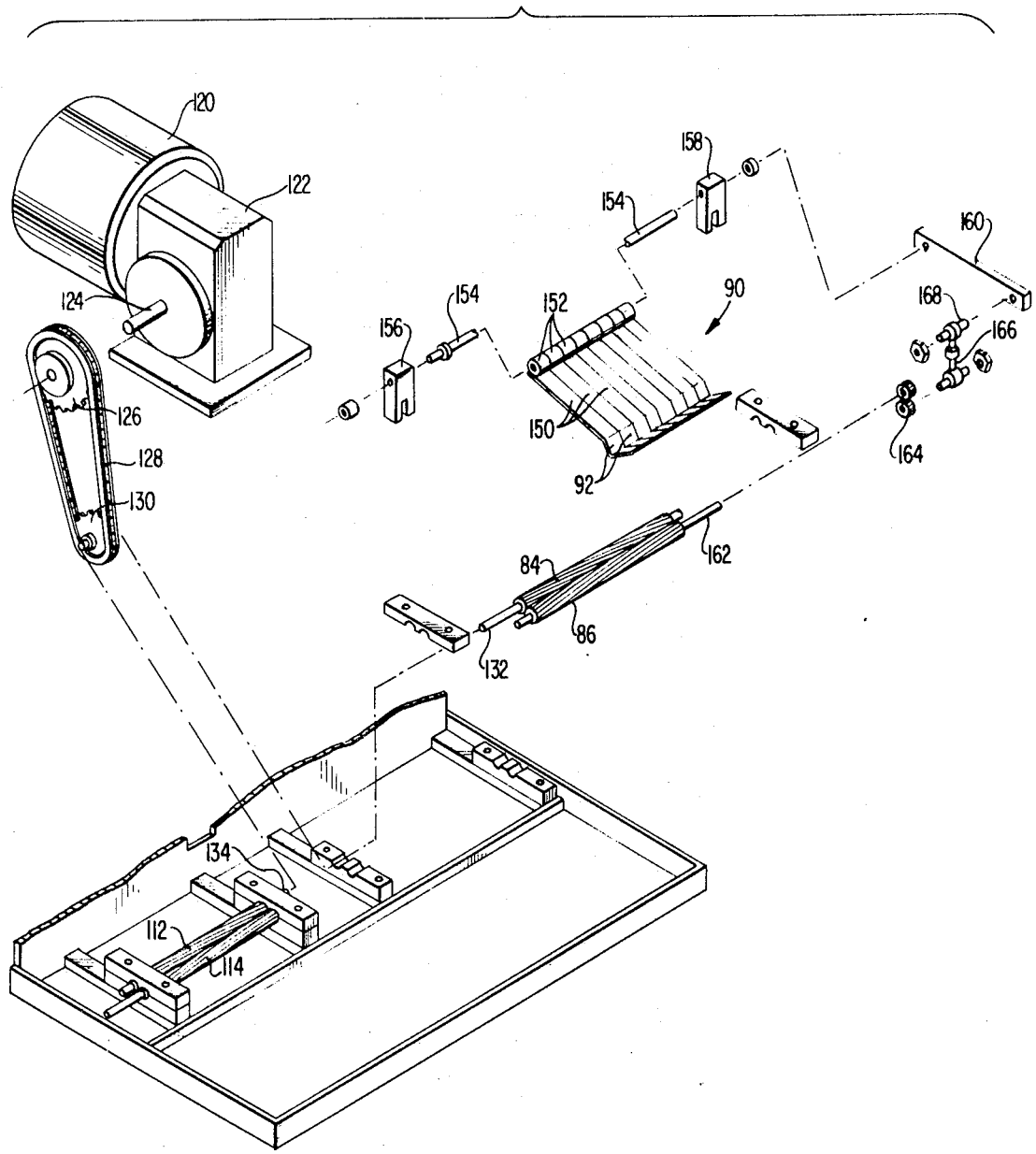
FIG 9 is a perspective view illustrating certain of the drive components of the machine.

A pair of exposed peeling rolls 112 and 114 is provided at the left-hand side of the inspection station as shown in FIG. 8 and when the operator discovers a gizzard which has been improperly cleaned, the offending gizzard is simply picked up and placed upside-down onto the rolls 112 and 114 for final manual cleaning. As is shown in Fig. 9, the rolls 84 and 112 are axially aligned whereas the rolls 86 and 114 are likewise axially aligned. A drive motor 120 and associated gear reduction box 122 drives the shaft 124 to which a sprocket 126 is affixed. The chain 128 is trained over this sprocket and over a sprocket 130 coupled at either side to the shaft portions 132 and 134 of the respective rolls 84 and 112 thereby to drive the two rolls 84 and 112 whereas the rolls 86 and 114 are driven by their interengagement with the respective driven rolls. As shown in FIG. 8, a suitable shield 136 is provided around the drive assembly 126, 128, 130.

The drive for the various chains 22, 34 and 50 is effected by the motor M shown in FIG. 2 coupled by a chain 140 to the driving sprocket 52 of the chain 50 and a chain 142 couples the shaft 29 with the shaft 40, the chain 142 extending from a suitable sprocket on the shaft 29 to an idler sprocket 144 shown in FIG. 1 and the shaft 40 being provided with a sprocket 146 engaging the outer side of one flight of the endless chain 142.

The drive motor for the rotary knife is indicated by the reference character 148.

FIG. 9 also illustrates the drive for the tamping device 90. As shown in FIG. 8, the tamping device 90 may be a solid plate member whereas, as shown in FIG. 9, same may be in the form of a series of individual fingers 150 welded at one end thereof to collars 152 which are adjustably mounted on the shaft 154 so that a desired vertical staggering of the fingers may be achieved. The shaft 154 is journaled adjacent its opposite ends in suitable bearing blocks 156 and 158 and one end of the shaft 154 is affixed to a lever 160. The idler roll 86 is provided with a shaft extension 162 carrying an eccentric 164 which is connected, through the adjustable connecting rod 166 to the lever 160 by the cross pins 168 substantially as is shown in FIG. 9. Thus, the drive imparted to the peeling rolls effects oscillation of the lever 60 and consequent vertical tamping motions of the V-shaped ends 170 of the fingers 150.

The present invention, therefore, is well adapted to carry out the objects and attain the ends and advantages mentioned as well as others inherent therein. While the presently illustrative embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In a machine for splitting, cleaning and removing the liner sac from the gizzards of fowl which includes means for conveying gizzards in oriented positions, means for splitting and spreading the gizzards as they are so oriented, a pair of intermeshed, helically ribbed peeling rolls onto one end of which the split and spread gizzards are discharged split side down, means for driving said rolls to transport the gizzards longitudinally along the rolls while removing the liner sac therefrom, the improvement comprising:

an inspection platform for receiving gizzards from the peeling rolls, and deflector means spaced from said one end of the rolls for turning said gizzards over and discharging them split side up onto said inspection platform.

2. In the machine according to claim 1 including a pair of exposed and driven peeling rolls in the region of said inspection platform for manual sac removal from an incompletely cleaned gizzard discharged onto said platform.

3. In the machine according to claim 2 wherein said exposed peeling rolls are aligned with and driven by the first mentioned peeling rolls.

4. In the machine according to claim 3 including tamping means aligned above the nip between the first mentioned peeling rolls, and means for cyclically moving said tamping means toward and away from said nip.

5. In the machine according to claim 4 wherein the last means comprises an eccentric driven by one of said peeling rolls and linkage connecting said eccentric to said tamping means.

6. In the machine according to claim 5 wherein said tamping means comprises a generally L-shaped plate pivoted along one edge thereof to present its opposite edge in alignment with said nip as aforesaid.

7. In the machine according to claim 5 wherein said tamping means comprises a plurality of generally L-shaped fingers and a rod to which one end of each finger is connected to align the opposite ends thereof with said nip as aforesaid, said linkage being connected to oscillate said rod.

* * * * *